United States Patent
Rylance et al.

(10) Patent No.: US 10,668,839 B2
(45) Date of Patent: Jun. 2, 2020

(54) TRIM COMPONENT FOR A BASE OF A VEHICLE SEAT AND METHOD OF MANUFACTURING THE TRIM COMPONENT

(71) Applicant: GM Global Technology Operations LLC, Detroit, MI (US)

(72) Inventors: Stephen Rylance, Holly, MI (US); Peter J. Randazzo, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 168 days.

(21) Appl. No.: 15/886,127

(22) Filed: Feb. 1, 2018

(65) Prior Publication Data

US 2019/0232836 A1     Aug. 1, 2019

(51) Int. Cl.
*B60N 2/20* (2006.01)
*B60N 2/58* (2006.01)
*B60N 2/64* (2006.01)
*B60N 2/68* (2006.01)

(52) U.S. Cl.
CPC ............. *B60N 2/5816* (2013.01); *B60N 2/20* (2013.01); *B60N 2/5891* (2013.01); *B60N 2/64* (2013.01); *B60N 2/68* (2013.01)

(58) Field of Classification Search
CPC ...... B60N 2/5816; B60N 2/20; B60N 2/5891; B60N 2/64; B60N 2/68
USPC .................................................... 297/354.12
See application file for complete search history.

(56) References Cited

U.S. PATENT DOCUMENTS

| | | | | |
|---|---|---|---|---|
| 8,960,803 B2* | 2/2015 | Mita | ..................... | B60N 2/6009 297/354.12 |
| 10,518,735 B2* | 12/2019 | Kondrad | ............. | B60R 21/2165 |
| 2010/0264710 A1* | 10/2010 | Lindsay | ................... | B60N 2/10 297/313 |
| 2011/0221254 A1* | 9/2011 | Lindsay | .............. | B29C 44/0461 297/452.18 |
| 2012/0153694 A1* | 6/2012 | Smith | .................. | B60N 2/3031 297/313 |
| 2017/0232877 A1* | 8/2017 | De Nichilo | .............. | B60N 2/68 297/452.18 |
| 2017/0305316 A1* | 10/2017 | Lafferty | ................ | B60N 2/5825 |
| 2018/0037148 A1* | 2/2018 | Line | ....................... | B60N 2/809 |
| 2018/0093597 A1* | 4/2018 | Namboodiri | ........... | B60N 2/688 |
| 2018/0361977 A1* | 12/2018 | Matusko | .................. | B60R 21/12 |
| 2019/0143857 A1* | 5/2019 | O'Hara | ................ | B60N 2/5621 297/180.13 |

* cited by examiner

*Primary Examiner* — Mark R Wendell

(57) ABSTRACT

A trim component for a vehicle seat base includes a center portion and first and second side portions. The center portion includes a center inner panel that can face a frame of the seat and a center outer panel that can to be visible within a passenger cabin of the vehicle. The center outer panel includes a flexible material and covers the center inner panel. The first and second side portions are fixed on opposite sides of the center portion. Each of the first and second side portions includes a side inner panel that can face the frame of the seat and a side outer panel that can be visible within the passenger cabin. The side outer panel includes the flexible material and covers the side inner panel. The trim component can be fixed to a back of the seat to conceal at least a portion of the frame.

12 Claims, 7 Drawing Sheets

TRIM COMPONENT FOR A BASE OF A VEHICLE SEAT AND METHOD OF MANUFACTURING THE TRIM COMPONENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a trim component for a base of a vehicle seat and a method of manufacturing the trim component.

Vehicle seats include a cushion portion, a back portion, and a frame extending through the cushion portion and the back portion. The frame is fixed to the vehicle, for example at the vehicle floor. The frame supports the cushion portion and the back portion. Each portion generally includes a foam component supported by the frame and an outer layer covering the foam. Some vehicle seats also include one or more trim components. For example, a toe kick may be provided at a base of a back of the vehicle seat.

SUMMARY

A trim component for a base of a seat in a vehicle according to the principles of the present disclosure includes a center portion and first and second side portions. The center portion includes a center inner panel that can face a frame of the seat and a center outer panel that can to be visible within a passenger cabin of the vehicle. The center outer panel includes a flexible material and covers the center inner panel. The first and second side portions are fixed on opposite sides of the center portion. Each of the first and second side portions includes a side inner panel that can face the frame of the seat and a side outer panel that can be visible within the passenger cabin. The side outer panel includes the flexible material and covers the side inner panel. The trim component can be fixed to a back of the seat so that the trim component conceals at least a portion of the frame of the seat.

In one aspect, each of the first and second side portions includes a first region and a second region. The first region can project away from the center portion in an aft direction with respect to the seat. The second region extends between the first region and the center portion. A distance between a bottom edge of the center portion and first and second bottom edges of the respective first and second side portions in the first region is greater than or equal to 10 mm and less than or equal to 50 mm in a direction parallel to a floor of the vehicle when the trim component is fixed to the back of the seat.

In one aspect, the back of the seat defines a first plane. The center portion defines a second plane when the trim component is fixed to the back of the seat. Rearmost surfaces of the first and second side portions define a third plane when the trim component is fixed to the back of the seat. A first angle between the second plane and the first plane is less than a second angle between the third plane and the first plane.

In one aspect, the first angle is less than or equal to 165°.

In one aspect, the center portion directly engages the frame of the seat.

In one aspect, the center inner panel and the side inner panels of the first and second side portions each include a plastic material.

In one aspect, the flexible material is selected from the group consisting of:
carpet, leather, suede, vinyl, and cloth.

In one aspect, the trim component further includes an elastic strap fixed to an edge of the center portion. The elastic strap can be fixed to the frame of the seat.

A seat for a vehicle according to the principles of the present disclosure includes a seat cushion portion, a seat back portion, a frame, and a trim component. The seat cushion portion can support an occupant sitting on the seat cushion portion. The seat cushion portion includes a cushion foam component and a cushion outer layer covering the cushion foam component. The seat back portion can support a back of the occupant sitting on the seat cushion portion. The seat back portion includes a back foam component and a back outer layer covering the back foam component. The frame can be fixed to a floor of the vehicle that supports the seat cushion portion and the seat back portion. The frame is disposed at least partially within the cushion outer layer and the back outer layer. The trim component engages the frame. The trim component has a first edge fixed to the seat back portion. A center portion of the trim component forms an angle of greater than 0° with respect to a plane perpendicular to the floor of the vehicle. A bottom edge of the center portion is disposed forward of a top edge of the center portion with respect to the seat. The trim component conceals at least a portion of the frame.

In one aspect, the center portion of the trim component includes a center inner panel facing the frame and a center outer panel visible within a passenger cabin of the vehicle. The center outer panel covers the center inner panel. The trim component further includes first and second side portions fixed on opposite sides of the center portion. Each of the first and second side portions includes a side inner panel facing the frame and a side outer panel visible within the passenger cabin. The side outer panel covers the side inner panel.

In one aspect, the first and second side portions at least partially wrap around respective first and second side shields of the frame to conceal the side shields from view with respect to an area directly behind the seat.

In one aspect, the trim component directly engages a cross-member of the frame.

In one aspect, the cushion foam component and the back foam component can remain engaged with one another when the seat back portion is pivoted between 20° forward of a design position with respect to the seat cushion portion and 40° rearward of the design position with respect to the seat cushion portion.

In one aspect, a back of the frame of the seat defines a plane and the back foam component is disposed entirely on one side of the plane.

In one aspect, a back of the frame of the seat defines a plane and the cushion foam component is disposed entirely on one side of the plane.

In one aspect, the seat cushion portion further includes a scrim having a first edge fixed to the cushion foam component and a second edge fixed to the frame of the seat. The scrim can limit movement of the cushion foam component with respect to the frame of the seat.

In one aspect, the trim component further includes an elastic strap fixed to a second edge of the trim component opposite the first edge of the trim component. The elastic strap can be fixed to the frame of the vehicle.

A method of manufacturing a trim component for a base of a seat in a vehicle according to the principles of the present disclosure includes assembling a center portion of the trim component. Assembling the center portion of the trim component includes placing a plastic center panel on a surface of a flexible center panel and sewing the plastic center panel to the flexible center panel. The method further includes assembling a first side portion of the trim component by placing a first plastic side panel on a surface of a first flexible side panel and sewing the first plastic side panel to the first flexible side panel. The method further includes assembling a second side portion of the trim component by placing a second plastic side panel on a surface of a second flexible side panel and sewing the second plastic side panel to the second flexible side panel. The method further includes joining the center portion and the first and second side portions by disposing the center portion between the first and second side portions and first and second sewing inner edges of the first and second side portions to respective first and second outer edges of the center portion. The method further includes fixing the trim component to a back of the seat so that the plastic center panel and the plastic side panels are disposed toward a frame of the seat. The flexible center panel and the flexible side panels cover the respective plastic center panel and plastic side panels. The trim component conceals at least a portion of the frame of the seat.

In one aspect, the assembling the center portion of the trim component includes wrapping a portion of the flexible center panel around an edge of the plastic center panel to sandwich the edge of the plastic center panel within a pocket formed by the flexible center panel and sewing the plastic center panel to the flexible center panel at the pocket of the flexible center panel. The assembling each side portion includes wrapping a portion of the flexible side panel around an edge of the plastic side panel to sandwich the edge of the plastic side panel within a pocket formed by the flexible side panel and sewing the plastic side panel to the flexible side panel at the pocket of the flexible side panel.

In one aspect, the assembling the center portion of the trim component further includes fixing an elastic strap to a bottom edge of the flexible center panel. The fixing the trim component to the back of the seat includes fixing a top edge of the trim component to the back of the seat and fixing the elastic strap the frame of the seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
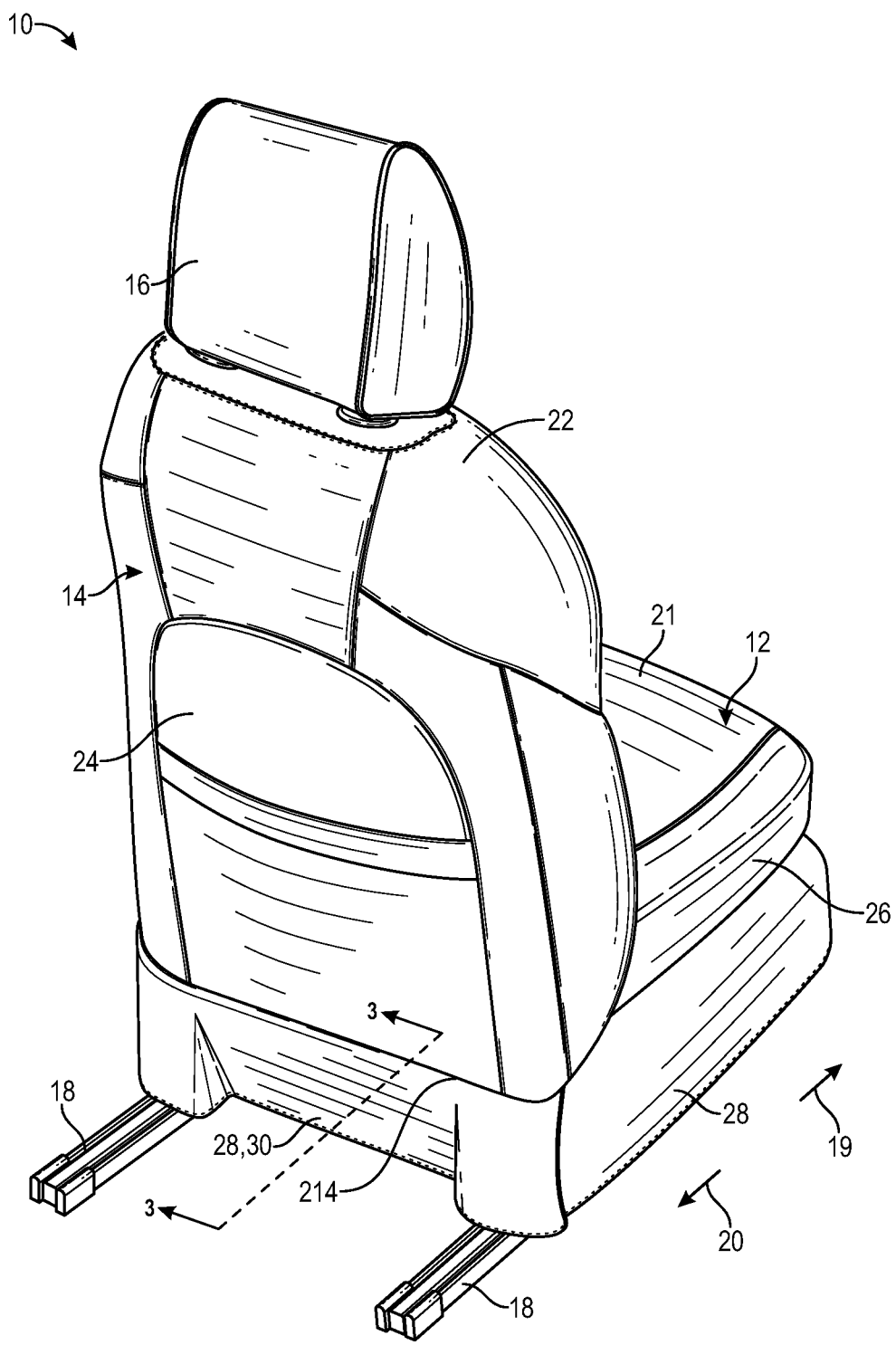
FIG. 1 is a perspective view of a back of a vehicle seat according to certain aspects of the present disclosure.

As discussed above, vehicle seats include a cushion portion and a back portion that are both attached to a frame. The cushion portion supports an occupant seated on the cushion portion and the back portion supports the back of the occupant seated on the cushion portion. The vehicle seat can also include various trim components, such as a toe kick. The toe kick may be fixed to a back of the vehicle seat near the base or bottom of the vehicle seat. The toe kick may at least partially conceal the seat frame, wiring, closeouts, and gaps between the cushion portion and the back portion.

In one example, a planar toe kick extends straight across the base of the vehicle seat in a cross-car direction. The toe kick is aligned with a plane defined by a rear surface of a back portion of a seat or plastic side shields. The toe kick has an outside surface that is visible by a passenger in a passenger cabin of the vehicle and an inside surface that is disposed toward a front of the seat. A position and orientation of the toe kick are limited by components of the cushion portion. More specifically, the toe kick contacts or abuts a foam component of the cushion portion that extends beyond a frame of the seat toward a back of the seat. The orientation of the toe kick, and more particularly its alignment with the back portion of the seat, limits floor space in the area behind the vehicle seat. Limited floor space may be problematic, for example, when a passenger is seated behind the vehicle seat (e.g., when the vehicle seat is in a front row of seats and a passenger is seated in a second row of seats). The planar toe kick wraps around a bottom portion of the vehicle seat and can appear bulky and/or unstructured.

In another example, a molded toe kick has a more structured appearance when compared to the planar toe kick described above. The molded toe kick is thermoformed, and therefore requires specialized tooling to manufacture. Furthermore, the rigid structure of the molded toe kick limits its applicability to certain sizes of vehicle seats and/or certain vehicle programs. Thus, each seat design or vehicle program may require unique tooling to manufacture the molded toe kick.

In various aspects, the present disclosure provides a contoured trim component or toe kick including flexible fabric outer panels and reinforcing plastic inner panels. The toe kick may include a center portion and two side portion disposed on either side of the center portion. The toe kick may be fixed to a back portion of a vehicle seat near the bottom or base of the vehicle seat. More specifically, the toe kick may include a top edge that is fixed to an outer layer, such as a fabric cover, of the seat back portion. The toe kick may include a bottom edge that wraps around a bottom of the seat and fastens to a frame of the seat within a seat cushion portion.

The back portion and the cushion portion of the vehicle seat may each include a foam component. The foam may have a reduced volume or size compared to the foam of the vehicle seat having the planar toe kick. For example, the foam may be disposed entirely on one side of a plane defined by a back of the seat frame such that it does not extend beyond the seat frame toward a rear of the seat. That is, the foam may be disposed entirely in front of the plane. Thus, the orientation of the toe kick is not limited by the foam components. The reduced foam volume may also contribute to an overall weight reduction of the vehicle.

The toe kick may conform to an outer boundary of the seat frame to maximize foot space in an area behind the seat. The toe kick may wrap around the bottom of the seat and engage portions of the seat frame to create a sculpted appearance. More particularly, the side portions of the toe kick may abut a plastic shield fixed to the seat frame and the center portion may engage a cross-member of the seat frame. The center portion may be angled inward toward a front of the seat to create the extra foot space. The side portions may project in a rearward direction with respect to the seat, conforming to the plastic shields and giving the toe kick the aesthetically-pleasing contoured appearance.

In various aspects, the present disclosure also provides a method of manufacturing the toe kick. The method includes assembling the center portion of the toe kick, assembling the side portions of the toe kick, joining the side portions to the center portion, and fixing the toe kick to the back of the seat. Assembling each of the center portion and the side portions may include sewing a plastic reinforcing panel to an underside of a flexible outer panel. Assembling the center portion may also include fixing one or more elastic straps to an edge of the center portion. Fixing the toe kick to the vehicle seat may include fixing a top edge of the toe kick to the seat back portion, such as by sewing, and fixing a bottom edge of the toe kick to the seat cushion portion or the frame using the elastic strap. Unlike the molded toe kick, specialized tooling is not required. Therefore the toe kick manufactured in accordance with the method of the present disclosure may be universally applicable to a variety of seats and vehicle programs.

Referring to FIG. 1, an example seat assembly according to certain aspects of the present disclosure is provided. The seat assembly may be a vehicle seat 10 disposed in a passenger cabin of a vehicle. The vehicle seat 10 includes a cushion portion 12, a back portion 14, and a headrest 16. The cushion portion 12 supports an occupant seated on the cushion portion 12. The back portion 14 supports a back of the occupant seated on the cushion portion 12. The headrest 16 supports a back of a head of the occupant seated on the cushion portion 12.

Figure 4:
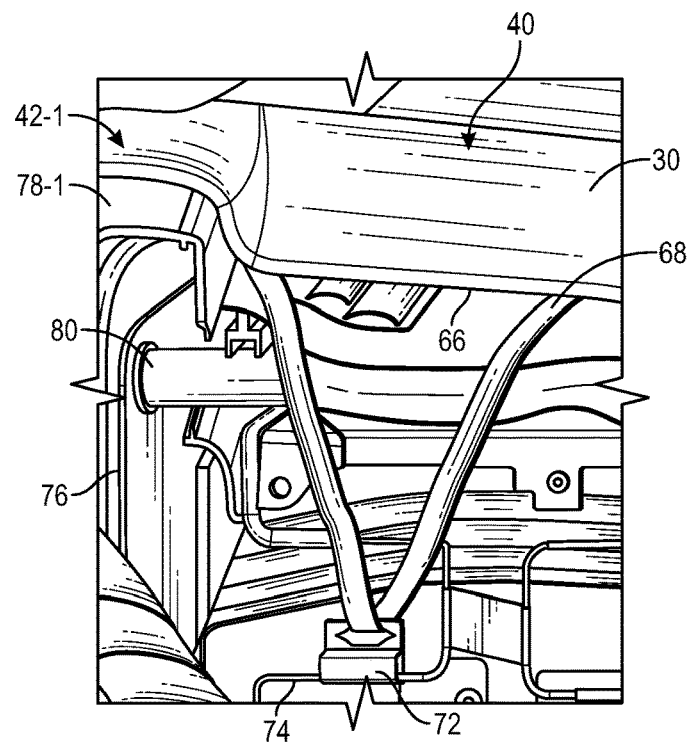
FIG. 4 is a partial perspective view of an underside of the vehicle seat of FIG. 1.

The cushion portion 12 and the back portion 14 are supported by a frame (see frame 76 of FIG. 4). The frame is fixed to the vehicle, such as to a floor of the vehicle. The frame may be directly fixed to the floor or the frame may alternatively slidably engage tracks 18 that are fixed to the floor, as shown. The seat 10 may be movable in forward 19 and aft 20 directions with respect to the seat.

As will be described in greater detail below, each of the cushion portion 12 and the back portion 14 includes a foam component (see foam components 120, 122 of FIG. 7). The cushion portion 12 and the back portion 14 also include respective outer layers 21, 22. The outer layers 21, 22 may include a soft material, such as cloth or leather. Portions of the outer layers 21, 22 may also include a hard material, such as plastic. For example, a back or rear side 24 of the back portion 14 or sides 26 of the cushion portion 12 may include the hard material.

Figure 2:
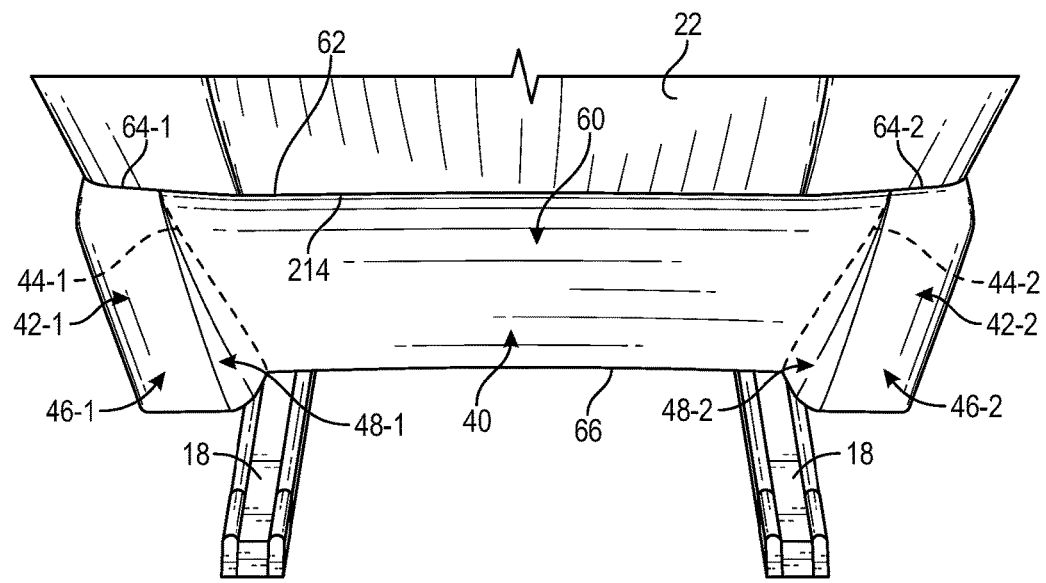
FIG. 2 is a perspective view of a trim component of the vehicle seat of FIG. 1.
Figure 3:
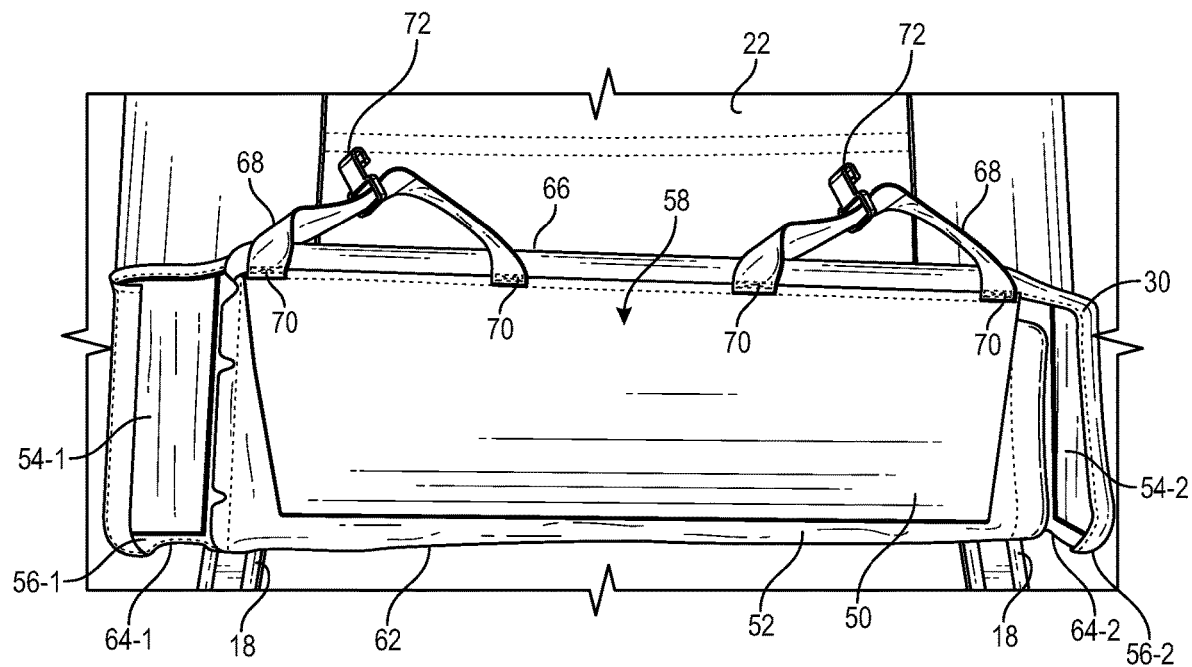
FIG. 3 is a perspective view of an underside of the trim component of FIG. 2.

The vehicle seat 10 further includes one or more trim components 28, such as a toe kick 30. The toe kick 30 at least partially covers the seat frame, as viewed from an area of the passenger cabin located behind the seat 10. With reference to FIGS. 2-3, the toe kick 30 includes a center portion 40, a first side portion 42-1, and a second side portion 42-2 (collectively referred to as the "side portions"). The center portion 40 is disposed between the first side portion 42-1 and the second side portion 42-2. The center portion 40 is fixed to the first and second side portions 42-1, 42-2 at first and second seams 44-1, 44-2, respectively.

The center portion 40 is angled inward toward a front of the seat 10 (e.g., in the forward direction 19). The first and second side portions 42-1, 42-2 project outward with respect to the center portion 40 toward a rear of the seat 10 (e.g., in the aft direction 20). The first side portion 42-1 includes a first back region 46-1 and a first connecting region 48-1. The second side portion 42-2 includes a second back region 46-1 and a second commenting region 48-2. The toe kick 30 is contoured to a portion of a back of the seat frame. The first and second back regions 46-1, 46-2 of the first and second side portions 42-1, 42-2 engage respective first and second plastic shields fixed to the seat frame (see, e.g., first plastic shield 78-1 of FIG. 4). The center portion 40 engages the seat frame (see cross-member 80 of FIG. 5). In various aspects, the first and second side portions 42-1, 42-2 may directly engage the respective first and second plastic shields and the center portion 40 may directly engage the cross-member of the seat frame. The first and second connecting regions 48-1, 48-2 of the first and second side portions 42-1, 42-2 extend between the respective first and second back regions 46-1, 46-2 and the center portion 40.

The center portion 40 includes a center inner panel 50 and a center outer panel 52. The first side portion 42-1 includes a first side inner panel 54-1 and a first side outer panel 56-1. The second side portion 42-2 includes a second side inner panel 54-2 and a second side outer panel 56-2. The outer panels 52, 56-1, 56-2 are disposed on top of or over the respective inner panels 50, 54-1, 54-2. The inner panels 50, 54-1, 54-2 face the seat frame so that they are disposed forward of the respective outer panels 52, 56-1, 56-2 (e.g., in the forward direction 19 with respect to the seat 10). That is, the inner panels 50, 54-1, 54-2 are exposed on an underside 58 of the toe kick 30 (FIG. 3). The outer panels 52, 56-1, 56-2 cover the respective inner panels 50, 54-1, 54-2 so that the inner panels 50, 54-1, 54-2 are not visible from within the passenger cabin. The outer panels 52, 56-1, 56-2 are disposed rearward of the respective inner panels 50, 54-1, 54-2 (e.g., in the aft direction 20 with respect to the seat). The outer panels 52, 56-1, 56-2 are visible from within the passenger cabin, and more particularly, from an area behind the vehicle seat 10. That is, the outer panels 52, 56-1, 56-2 are exposed on an outside 60 of the toe kick 30 (FIG. 2).

The inner panels 50, 54-1, 45-2 serve as a reinforcing layer to make portions of the toe kick 30 rigid and structured in appearance. The inner panels 50, 54-1, 54-2 include a plastic material. In various aspects, the inner panels 50, 54-1, 54-2 may be referred to as the plastic center panel 50 and the plastic side panels 54-1, 54-2. The plastic material is flat. The plastic material has a thickness of greater than or equal to 0.5 mm and less than or equal to 1.5 mm, optionally 1 mm, by way of non-limiting example. The center inner panel 50 and the side inner panels 54-1, 54-2 may all include the same plastic material.

The outer panels 52, 56-1, 56-2 conceal the inner panels 50, 54-1, 54-2 to improve an appearance of the toe kick 30. The outer panels 52, 56-1, 56-2 include a flexible material. In various aspects, the outer panels 52, 56-1, 56-2 may be referred to as the flexible center panel 52 and the flexible side panels 56-1, 56-2. The flexible material may be carpet, leather, suede, vinyl, or cloth, by way of non-limiting example. The flexible material for the outer panels 52, 56-1, 56-2 may be selected from the group consisting of: carpet, leather, suede, vinyl, cloth, and combinations thereof. The center outer panel 52 and the side outer panels 56-1, 56-2 may all include the same flexible material. In various aspects, the center outer panel 52 may include a first flexible material and the side outer panels 56-1, 56-2 may include a distinct second flexible material.

The first and second side inner panels 54-1, 54-2 are disposed within the respective first and second back regions 46-1, 46-2 of the first and second side portions 42-1, 42-2. The first and second side inner panels 54-1, 54-2 may be disposed entirely within the respective first and second back regions 46-1, 46-2 so that the first and second connecting regions 48-1, 48-2 remain flexible to contour with the seat frame. In contrast, the first and second back regions 46-1, 46-2 of the first and second side portions 42-1, 42-2 and the center portion 40 are reinforced to maintain a structure and shape of the toe kick 30. For example, the toe kick 30 may remain structured when the occupant seated behind the vehicle seat 10 rests his or her feet on the toe kick 30. The inner panels 50, 54-1, 54-2 may not directly contact one another.

A first or top edge of the toe kick 30 is fixed to the seat back portion 14. The center outer panel 52 includes a top edge 62. The first and second side outer panels 56-1, 56-2 includes respective first and second top edges 64-1, 64-2. The top edges 62, 64-1, 64-2 of the outer panels 52, 56-1, 56-2 are fixed to the outer layer 22 of the seat back portion 14. For example, the outer panels 52, 56-1, 56-2 may be sewn to the outer layer 22 when the outer layer 22 is a soft material, such as leather or cloth.

A second or bottom edge 66 of the toe kick 30 is sewn to one or more elastic straps 68. As a non-limiting example, the one or more elastic straps 68 may include two elastic straps 68. Each elastic strap 68 includes ends 70 that are fixed to the bottom edge 66 of the toe kick 30 to form loops. Each elastic strap 68 may also include a fastener 72. The fastener 72 may be a 25 mm J-retainer, by way of non-limiting example. The fastener 72 may loosely slip along the elastic strap 68.

Figure 5:
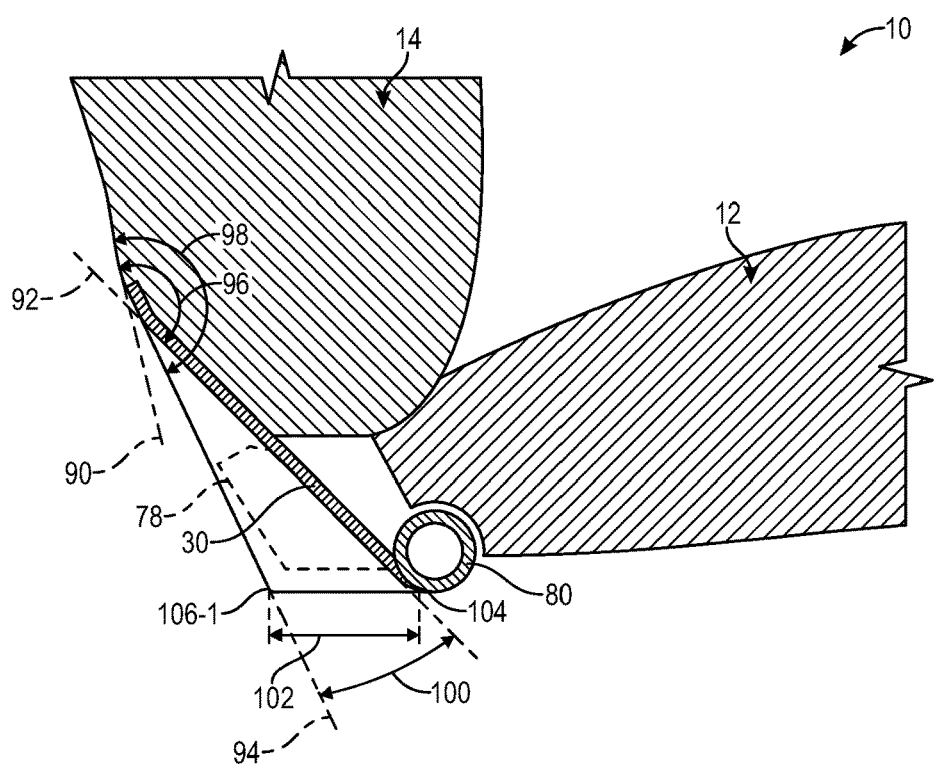
FIG. 5 is a partial sectional view of the vehicle seat of FIG. 1 taken at line 3-3 of FIG. 1.

Referring to FIG. 4, the fastener 72 hooks around a portion of a suspension mat 74 within the cushion portion 12 of the vehicle seat 10. The elastic straps 68 are stretched to pull the center portion 40 in the forward direction 19 (FIG. 1) toward the front of the seat 10. When center portion 40 is pulled forward, the first and second side portions 42-1, 42-2 are also pulled forward until the underside 58 of the toe kick 30 engages a frame 76. More specifically, the first side portion 42-1 engages a first plastic shield 78-1 of the frame 76 and the second side portion 42-2 engages a second plastic shield (not shown) of the frame. The center portion 40 engages a cross-member 80 of the frame 76, which may be a metal cross-member. The suspension mat 74 is fixed to the frame 76. Thus, the toe kick 30 is fixed to the frame through the suspension mat 74. In various aspects, the center portion 40 may directly engage the cross-member of the frame (FIG. 5). The toe kick 30 may be pulled taut over a back of the frame 76 to give the toe kick 30 a contoured or sculpted appearance.

With reference to FIG. 5, the center portion 40 of the toe kick 30 may be in direct contact with the cross-member 80 of the frame 76. The back or rear side 24 of the back portion 14 defines a first plane 90. The center portion 40 of the toe kick 30 defines a second plane 92. The rearmost surfaces (i.e., surfaces of the first and second back regions 46-1, 46-2 of the first and second side portions 42-1, 42-2) of the first and second side portions 42-1, 42-2 of the toe kick 30 define a third plane 94.

A first angle 96 is formed between the first plane 90 and the second plane 92. A second angle 98 is formed between the first plane 90 and the third plane 94. A third angle 100 is formed between the second plane 92 and the third plane 94. A magnitude of the first angle 96 is less than a magnitude of the second angle 98. Thus, the center portion 40 is angled further inward toward the front of the seat 10 (e.g., in the forward direction 19) when compared to the first and second side portions 42-1, 42-2. In various aspects, the center portion 40 may form an angle of greater than 0° with respect to a plane perpendicular to the floor of the vehicle.

The first angle 96 may be less than or equal to 165°, optionally less than or equal to 160°, optionally less than or equal to 155°, and optionally less than or equal to 150°. In various aspects, the first angle 96 is greater than or equal to 135° and less than or equal to 165°, optionally greater than or equal to 140° and less than or equal to 160°, optionally greater than or equal to 145° and less than or equal to 155°, and optionally 150°. The second angle 98 may be greater than 165°, and optionally greater than or equal to 170°. The third angle 100 may be greater than or equal to 5°, optionally greater than or equal to 10°, optionally greater than or equal to 15°, and optionally greater than or equal to 20°.

A distance 102 is defined between first and second bottom edges 104-1, 104-2 of the first and second back regions 46-1, 46-2 of the first and second side portions 42-1, 42-2 and a bottom edge 106 of the center portion 40. The distance 102 may be measured in a direction parallel to the vehicle floor. The distance 102 may be less than or equal to 50 mm, optionally greater than or equal to 10 mm and less than or equal to 50 mm, optionally greater than or equal to 15 mm and less than or equal to 50 mm, optionally greater than or equal to 15 mm and less than or equal to 35 mm, optionally greater than or equal to 20 mm and less than or equal to 30 mm, optionally greater than or equal to 23 mm and less than or equal to 27 mm, and optionally 25 mm. In various aspects, the distance may be greater than or equal to 15 mm, optionally greater than or equal to 20 mm, and optionally greater than or equal to 25 mm. The toe kick 30 in accordance with the present disclosure may provide greater than or equal to about 15 mm foot space when compared to the straight, unstructured toe kick described above.

Figure 6:
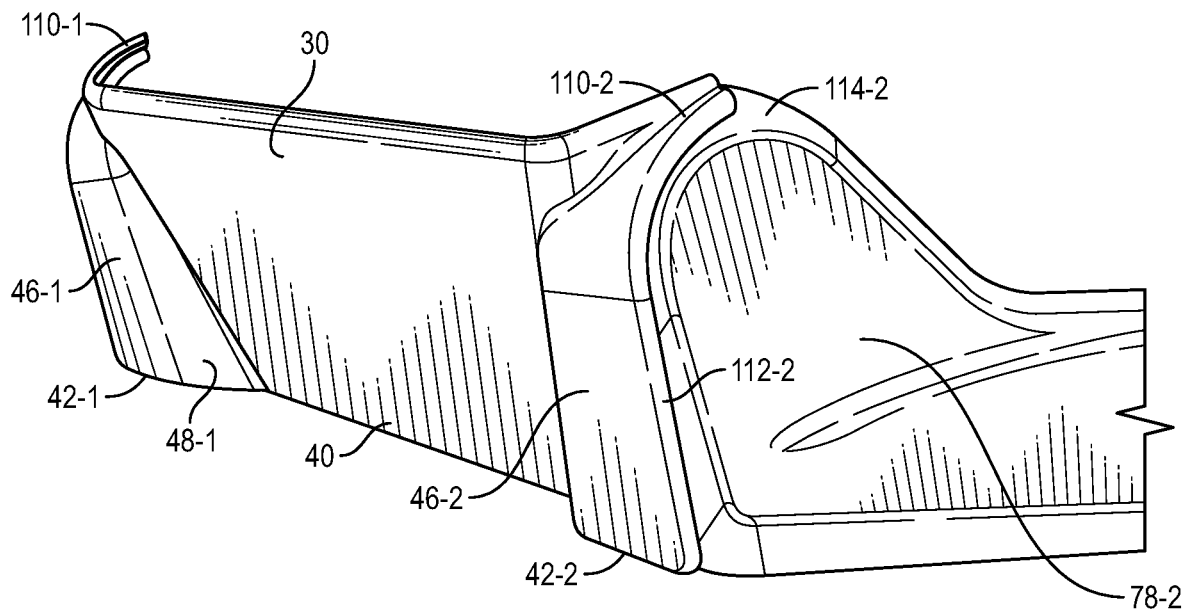
FIG. 6 is a perspective view of the trim component of FIG. 2 engaging a side shield of a vehicle frame.

With reference to FIG. 6, the toe kick 30 may at least partially wrap around the first and second side shields 78-1 (FIG. 4), 78-2. The first side portion 42-1 may include a first top region 110-1 and a first side region (not shown). The second side portion 42-2 may include a second top region 110-2 and a second side region 112-2. The first and second top regions 110-1, 110-2 are disposed above respective first and second back regions 46-1, 46-2 (i.e., closer to the seat back portion 14). The first top region 110-1 wraps around the first side shield 78-1, following a contour of a first edge (not shown) of the first side shield 78-1. In a similar manner, the second top region 110-2 wraps around the second side shield 78-2, following a contour of a second edge 114-2 of the second side shield 78-2. The first side region is disposed outboard of the first back region 46-1 with respect to the seta 10. The first side region at least wraps partially around the first edge of the first side shield 78-1. The second side region 112-2 is disposed outboard of the second back region 46-2 with respect to the seat. The second side region 112-2 at least partially wraps around the second edge 114-2 of the second side shield 78-2. The side regions 112 at least partially conceal the side shields 78-1, 78-2 as viewed from an area behind the seat 10. In various aspects, the side regions 112 fully conceal the side shields 78-1, 78-2 as viewed from the area behind the seat 10.

Figure 7:
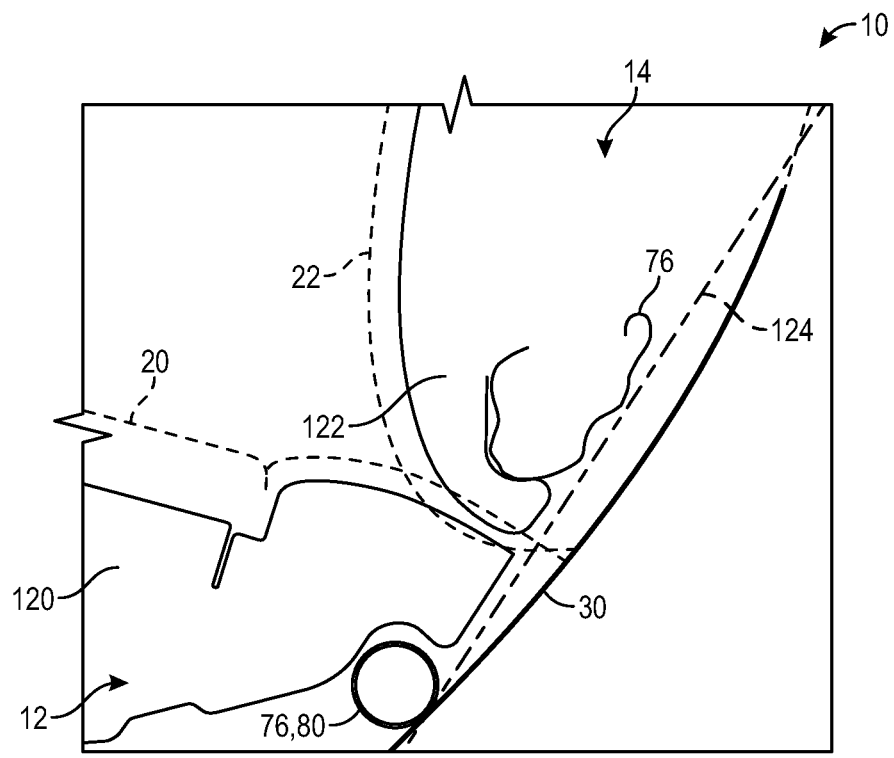
FIG. 7 is a plan view of the vehicle seat of FIG. 1.

Referring to FIG. 7, the seat cushion portion 12 includes the outer layer 21, a cushion foam component 121, and the frame 76, including the cross-member 80. The seat back portion 14 includes the outer layer 22, a back foam component 122, and the frame 76. The seat 10 also includes the toe kick 30. The toe kick 30 extends from the rear side 24 of the seat back portion 14 to the cross-member 80 of the frame.

The foam components 121, 122 are disposed entirely on one side of a frame plane 124 defined by a back of the seat frame 76 when the seat 10 is in the design position. More particularly, the foam components 121, 122 are disposed frontward (e.g., in the forward direction 19) of the frame plane 124. The foam components 121, 122 may be disposed entirely in front of the frame plane 124 such that neither foam component 121, 122 extends beyond the frame 76 when the seat 10 is in the design position. The foam components 121, 122 are sized and shaped to ensure that they remain in contact with one another during rotation of the seat back portion 14 with respect to the seat cushion portion 12 (e.g., the seat back portion 14 is pivoted between 20° forward of the design position and 40° rearward of the design position with respect to the cushion portion 12). The design position refers to the orientation of the cushion portion 12 and the back portion 14 with respect to the vehicle (e.g., the floor) and to one another prior to the user adjusting height, angle, or location of the cushion and back portions 12, 14. The design position includes a set of predetermined values set by the seat or vehicle manufacturer.

Figure 8:
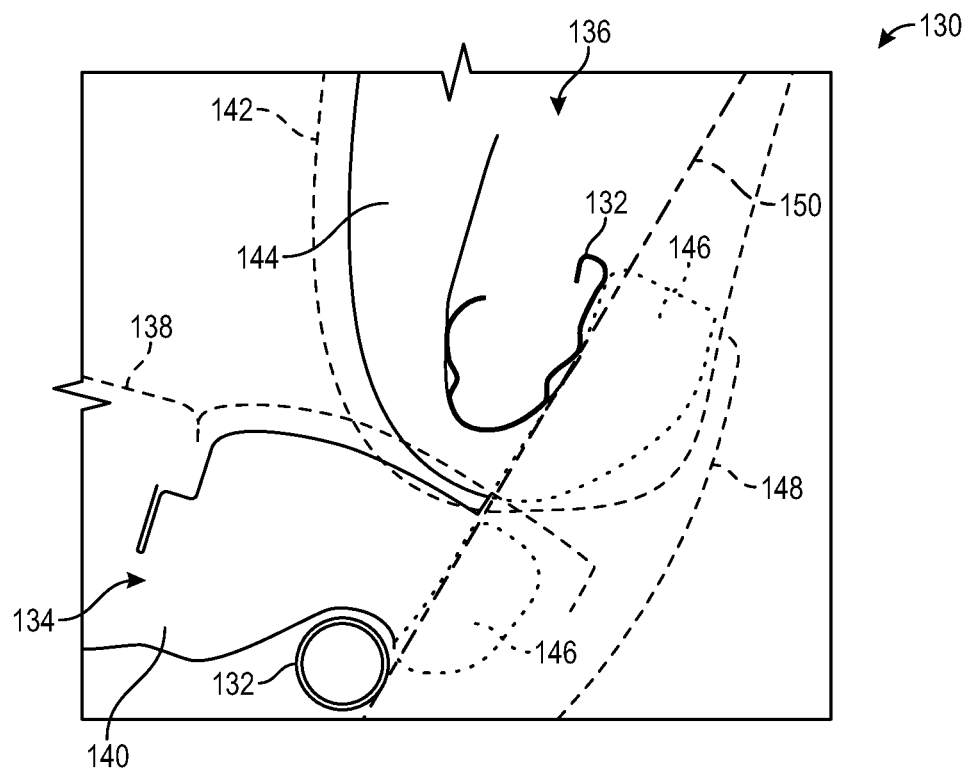
FIG. 8 is a plan view of another vehicle seat.

FIG. 8 shows another vehicle seat 130 for reference. The vehicle seat 130 includes a frame 132, cushion portion 134, and a back portion 136. The cushion portion 134 includes an outer layer 138 and a foam component 140. The back portion 136 includes an outer layer 142 and a foam component 144. The foam components 140, 144 have a smaller volume compared to the foam components 121, 122 of the seat 10 in accordance with the present disclosure. Portions 146 of each foam component 140, 144, represented by a dashed line, are present in the reference vehicle seat 130 and absent from the vehicle seat 10 of the present disclosure. The seat 130 further includes a toe kick 148. A position of the toe kick 148 is limited by the foam components 140, 144, which extend beyond a frame plane 150 defined by a back of the vehicle frame when the seat 130 is in the design position. In contrast, the reduced-size or trimmed foam components 121, 122 of the seat 10 of FIG. 7 enable the bottom edge 66 of the toe kick 30 to be pivoted in the forward direction 19 (FIG. 1) to increase the floor space behind the seat 10.

Figure 9A:
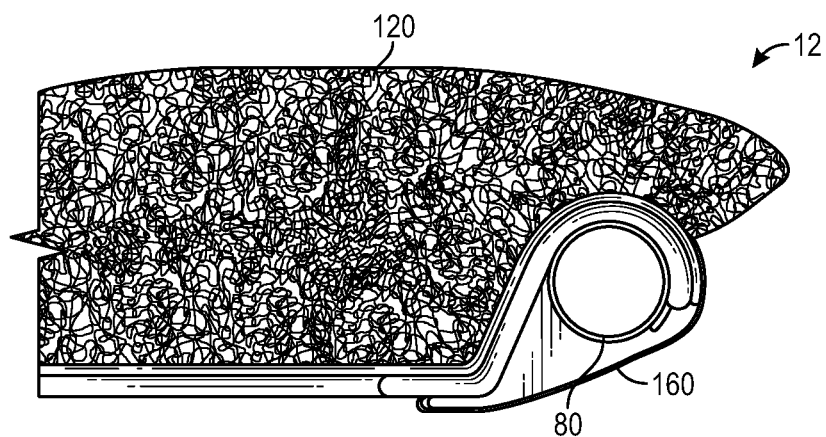
FIGS. 9A-9B are sectional views of a cushion portion of the vehicle seat of FIG. 1.
Figure 9B:
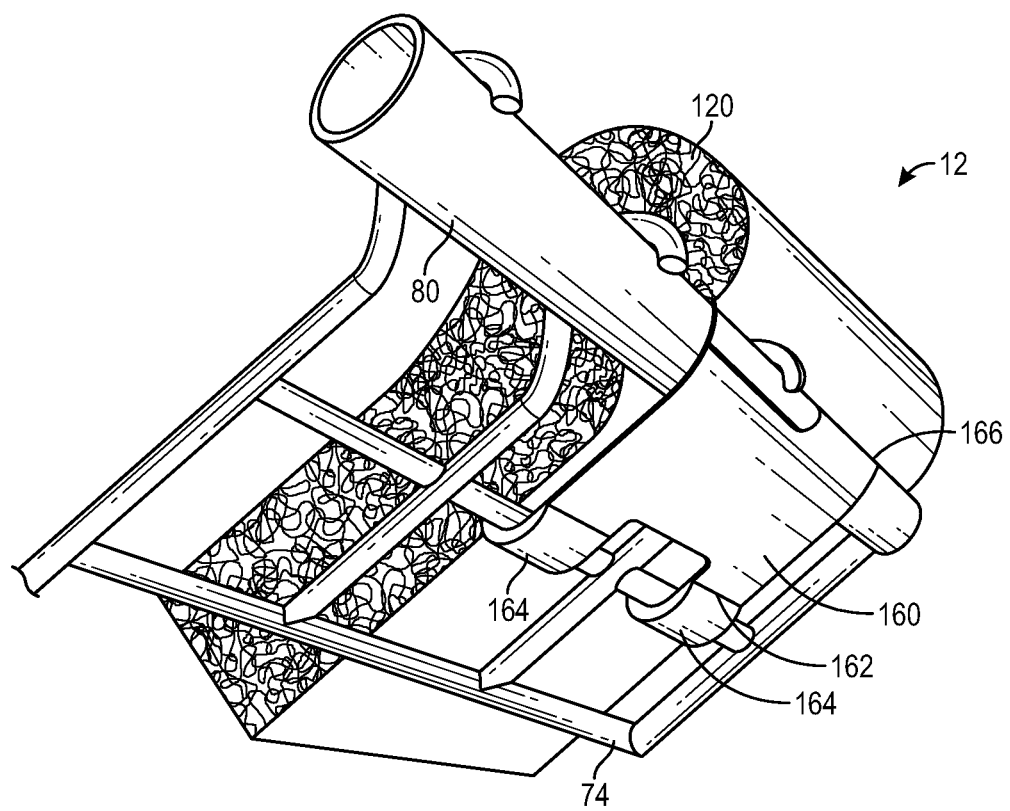

With reference to FIGS. 9A-9B, the seat cushion portion 12 may further include an anchor, such as a scrim 160. As discussed above, it is advantageous for the cushion foam component 121 and the back foam component 122 to remain in contact when the back portion 14 rotates with respect to the cushion portion 12. A first edge 162 of the scrim 160 is fixed to the suspension mat 74 by one or more clips 164. A second edge 166 of the scrim 160 opposite the first edge 162 of the scrim 160 is fixed to the cushion foam component 121. The second edge 166 of the scrim 160 may be fixed to the cushion foam component 121, for example, by molding or sewing in place. The scrim 160 can prevent or reduce sliding of the cushion foam component 121 with respect to the suspension mat 74 to increase contact between the cushion foam component 121 and the back foam component 122.

Figure 10:
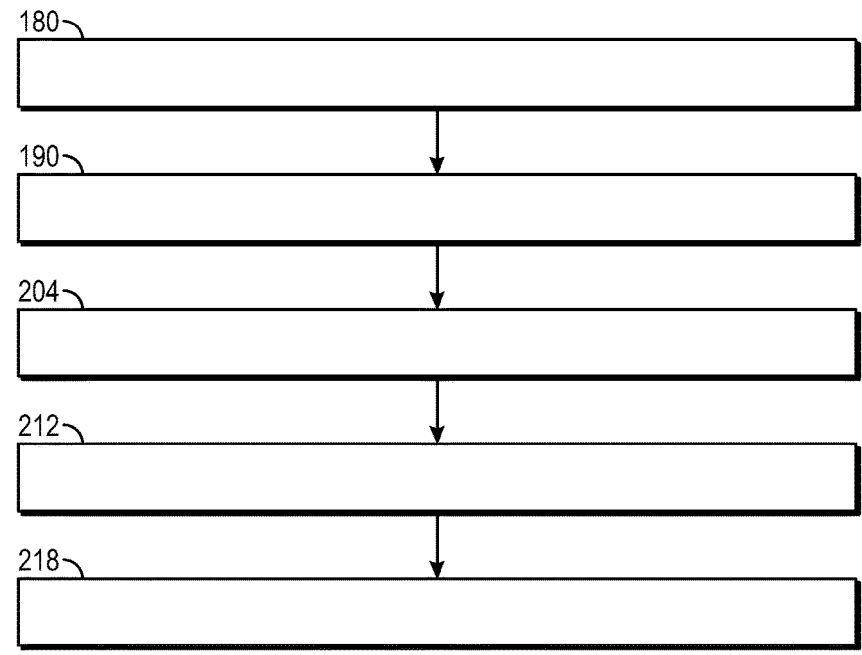
FIG. 10 is a flowchart depicting a method of manufacturing the trim component of FIG. 2.
Figure 11:
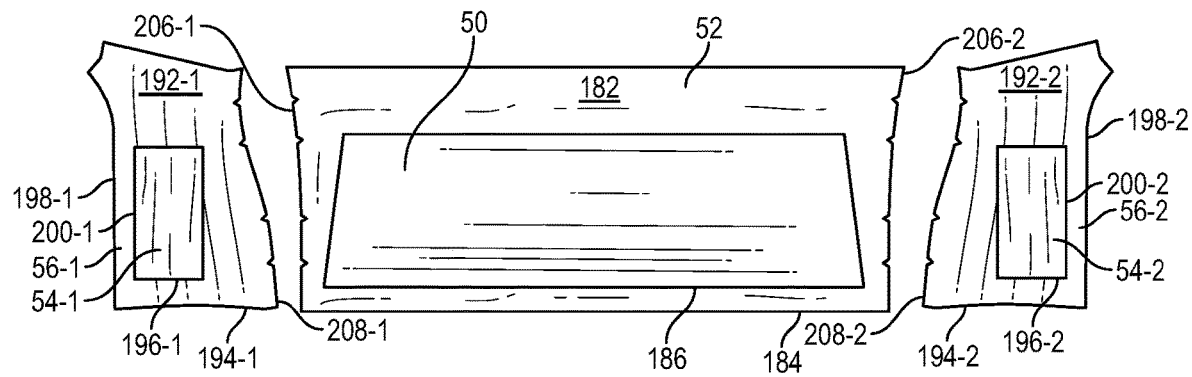
FIG. 11 is a partial exploded view of the underside of the trim component of FIG. 2, the trim component being disassembled.

Referring to FIGS. 10-11, a method of manufacturing the toe kick 30 is provided. The method begins at 180. At 180, the center portion 40 is formed by joining the inner panel 50 to the center outer panel 52 and the elastic straps 68 (FIGS. 3-4). The center inner panel 50 is placed on an underside surface 182 of the center outer panel 52. A bottom portion adjacent to the bottom edge 184 of the center outer panel 52 is folded over a bottom edge 186 of the center inner panel 50 so that the bottom edge 186 of the center inner panel 50 is disposed within a first pocket (not shown) formed by folding the center outer panel 52. The bottom edge 186 of the center inner panel 50 is sandwiched within the first pocket. The ends 70 of the elastic straps 68 (FIG. 3) are placed on top of the first pocket formed by the center outer panel 52. A first hem is created by sewing the center outer panel 52 to the center inner panel 50 and the ends 70 of the elastic straps 68 along the bottom edge 186 of the center inner panel 50. In alternative embodiments, the elastic straps 68 may be attached in a separate step from forming the first hem.

At 190, the first and second side inner panels 54-1, 54-2 are joined to the respective first and second side outer panels 56-1, 56-1 to form the first and second side portions 42-1, 42-1. The first and second side inner panels 54-1, 54-2 are placed on respective first and second underside surfaces 192-1, 192-2 of the first and second side outer panels 56-1, 56-2. Bottom portions of first and second bottom edges 194-1, 194-2 of the first and second side outer panels 56-1, 56-2 are folded over respective first and second bottom edges 196-1, 196-2 of the first and second side inner panels 54-1, 54-2 so that the first and second bottom edges 196-1, 196-2 of the first and second side inner panels 54-1, 54-2 are disposed within respective second and third pockets (not shown) formed by folding the first and second side outer panels 56-1, 56-2. The first bottom edge 194-1 of the first side inner panel 54-1 is sandwiched within the second pocket. The second bottom edge 194-2 of the second side inner panel 54-2 is sandwiched within the third pocket. Second and third hems are created by sewing the first and second side outer panels 56-1, 56-2 to respective side inner panels 54-1, 54-2.

First and second outside portions of first and second outside edges 198-1, 198-2 of the first and second side outer panels 56-1, 56-2 are folded over respective first and second outside edges 210-1, 210-2 of the first and second side inner panels 54-1, 54-2 so that the first and second outside edges 210-1, 210-2 of the first and second side inner panels 54-1, 54-2 are disposed within respective fourth and fifth pockets (not shown) formed by folding the first and second side outer panels 56-1, 56-2. The first outside edge 200-1 of the first side inner panel 54-1 is sandwiched within the fourth pocket. The second outside edge 200-2 of the second side inner panel 54-2 is sandwiched within the fifth pocket. Fourth and fifth hems are created by sewing the first and second side outer panels 56-1, 56-2 to respective first and second side inner panels 54-1, 54-2. The first hems, second hems, third hems, fourth hems, and fifth hems may be created by back-sewing to prevent the thread from unraveling.

At 204, the center portion 40 is joined to the first and second side portions 42-1, 42-2 to form the toe kick 30. More specifically, first and second outside edges 206-1, 206-2 of center outer panel 52 are joined to first and second inside edges 208-1, 208-2 of the first and second side outer panels 56-1, 56-2. The edges 206, 208-1, 208-2 may be joined by sewing to form the first and second seams 44-1, 44-2.

At 212, the toe kick 30 is fixed to the seat back portion 14. When the outer layer 22 is a flexible material, such as cloth or leather, the top edges 62, 64-1, 64-2 of the outer panels 52, 56-1, 56-2 are fixed to the bottom edge 214 of the outer layer 22. The top edges 62, 64-1, 64-2 of the outer panels 52, 56-1, 56-2 of the toe kick 30 may be fixed to the bottom edge 214 of the outer layer 22 of the seat back portion 14, for example, by sewing. When the outer layer 22 is a rigid material, such as plastic, the top edges 62, 64-1, 64-2 of the outer panels 52, 56-1, 56-2 of the toe kick 30 may be fixed to the seat frame 76 within the seat back portion 14. The outer layer 22 may be fixed to the seat back portion 14 so that it overlaps the top edges 62, 64-1, 64-2 of the outer panels 52, 56-1, 56-2 of the toe kick 30.

At 218, the bottom edge 66 of the toe kick 30 is fixed to the seat cushion portion 12. More specifically, the fasteners 72 on the straps 68 of the toe kick 30 are fixed to the suspension mat 74. Thus, the toe kick 30 extends around the bottom or base of the back of the vehicle seat 10, at least partially covering the seat frame 76.

The toe kick 30 may be used in an automobile, such as on vehicle seats disposed in front of other vehicle seats or storage areas. The toe kick 30 may be used in other non-automotive vehicle applications, such as for airplane seats, train seats, bus seats, and agricultural equipment seats, by way of non-limiting example. Although the toe kick 30 is shown as described as being assembled to the vehicle seat 10, alternative non-vehicle uses are also contemplated. For example, the toe kick 30 may be used for seats in airports, waiting rooms, classrooms, and offices.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A seat for a vehicle comprising:
a seat cushion portion configured to support an occupant sitting on the seat cushion portion, the seat cushion portion including a cushion foam component and a cushion outer layer covering the cushion foam component;
a seat back portion configured to support a back of the occupant sitting on the seat cushion portion, the seat back portion including a back foam component and a back outer layer covering the back foam component;
a frame configured to be fixed to a floor of the vehicle that supports the seat cushion portion and the seat back portion, the frame being disposed at least partially within the cushion outer layer and the back outer layer; and
a trim component engaging the frame and having a first edge fixed to the seat back portion, the trim component including a center portion, a first side portion, and a second side portion, the center portion forming an angle of greater than 0° with respect to a plane perpendicular to the floor of the vehicle such that a bottom edge of the center portion is disposed forward of a top edge of the center portion with respect to the seat, wherein:
the trim component conceals at least a portion of the frame;
the center portion includes a center inner panel facing the frame and a center outer panel visible within a passenger cabin of the vehicle, the center outer panel covering the center inner panel; and
the first side portion and the second side portion are fixed on opposite sides of the center portion, each of the first side portion and the second side portion including a side inner panel facing the frame and a side outer panel visible within the passenger cabin, the side outer panel covering the side inner panel.

2. The seat of claim 1 wherein:
each of the first and second side portions includes a first region configured to project away from the center portion in an aft direction with respect to the seat and a second region extending between the first region and the center portion; and
a distance between a bottom edge of the center portion and first and second bottom edges of the respective first and second side portions in the first region is greater than or equal to 10 mm and less than or equal to 50 mm in a direction parallel to a floor of the vehicle when the trim component is fixed to the back of the seat.

3. The seat of claim 1 wherein:
the back of the seat defines a first plane;
the center portion defines a second plane when the trim component is fixed to the back of the seat;
rearmost surfaces of the first and second side portions define a third plane when the trim component is fixed to the back of the seat; and
a first angle between the second plane and the first plane is less than a second angle between the third plane and the first plane.

4. The seat of claim 1 wherein the center inner panel and the side inner panels include a plastic material.

5. The seat of claim 1 wherein the center outer panel and the side outer panels include a flexible material selected from the group consisting of: carpet, leather, suede, vinyl, and cloth.

6. The seat of claim 1 wherein:
the first side portion at least partially wraps around a first side shield of the frame to conceal the first side shield from view with respect to an area directly behind the seat; and
the second side portion at least partially wraps around a second side shield of the frame to conceal the second side shield from view with respect to the area.

7. The seat of claim 1 wherein the trim component directly engages a cross-member of the frame.

8. A seat for a vehicle comprising:
a seat cushion portion configured to support an occupant sitting on the seat cushion portion, the seat cushion portion including a cushion foam component and a cushion outer layer covering the cushion foam component;
a seat back portion configured to support a back of the occupant sitting on the seat cushion portion, the seat back portion including a back foam component and a back outer layer covering the back foam component;
a frame configured to be fixed to a floor of the vehicle that supports the seat cushion portion and the seat back portion, the frame being disposed at least partially within the cushion outer layer and the back outer layer; and
a trim component engaging the frame and having a first edge fixed to the seat back portion, the trim component including a center portion forming an angle of greater than 0° with respect to a plane perpendicular to the floor of the vehicle such that a bottom edge of the center portion is disposed forward of a top edge of the center portion with respect to the seat, wherein the cushion foam component and the back foam component are configured to remain engaged with one another when the seat back portion is pivoted between 20° forward of a design position with respect to the seat cushion portion and 40° rearward of the design position with respect to the seat cushion portion.

9. The seat of claim 8 wherein a back of the frame of the seat defines a plane and the back foam component is disposed entirely on one side of the plane.

10. The seat of claim 8 wherein a back of the frame of the seat defines a plane and the cushion foam component is disposed entirely on one side of the plane.

11. The seat of claim 10 wherein the seat cushion portion further includes a scrim having a first edge fixed to the cushion foam component and a second edge fixed to the frame of the seat, the scrim being configured to limit movement of the cushion foam component with respect to the frame of the seat.

12. A seat for a vehicle comprising:
a seat cushion portion configured to support an occupant sitting on the seat cushion portion, the seat cushion portion including a cushion foam component and a cushion outer layer covering the cushion foam component;
a seat back portion configured to support a back of the occupant sitting on the seat cushion portion, the seat back portion including a back foam component and a back outer layer covering the back foam component;
a frame configured to be fixed to a floor of the vehicle that supports the seat cushion portion and the seat back portion, the frame being disposed at least partially within the cushion outer layer and the back outer layer; and
a trim component engaging the frame and having a first edge fixed to the seat back portion, the trim component including a center portion and an elastic strap, the center portion forming an angle of greater than 0° with respect to a plane perpendicular to the floor of the vehicle such that a bottom edge of the center portion is disposed forward of a top edge of the center portion with respect to the seat, the elastic strap being fixed to a second edge of the trim component opposite the first edge of the trim component, the elastic strap being configured to be fixed to the frame of the vehicle.

\* \* \* \* \*